US012240414B2

(12) United States Patent
Diamond et al.

(10) Patent No.: US 12,240,414 B2
(45) Date of Patent: Mar. 4, 2025

(54) VEHICLE SENSOR CONTROL FOR OPTIMIZED MONITORING OF PREFERRED OBJECTS WITHIN A VEHICLE PASSENGER CABIN

(71) Applicant: Ford Global Technologies, LLC, Dearborn, MI (US)

(72) Inventors: Brendan Francis Diamond, Grosse Pointe, MI (US); Stuart C. Salter, White Lake, MI (US); Hussein H. Berry, Dearborn, MI (US); John Robert Van Wiemeersch, Novi, MI (US); Tarik Safir, Chesterfield (GB)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 17/569,732

(22) Filed: Jan. 6, 2022

(65) Prior Publication Data
US 2023/0211753 A1  Jul. 6, 2023

(51) Int. Cl.
| | | |
|---|---|---|
| *B60R 25/01* | (2013.01) | |
| *B60H 1/00* | (2006.01) | |
| *B60R 25/102* | (2013.01) | |
| *B60R 25/24* | (2013.01) | |
| *B60R 25/31* | (2013.01) | |
| *G06V 10/764* | (2022.01) | |

(Continued)

(52) U.S. Cl.
CPC ......... *B60R 25/31* (2013.01); *B60H 1/00792* (2013.01); *B60R 25/01* (2013.01); *B60R 25/102* (2013.01); *B60R 25/24* (2013.01); *G06V 10/764* (2022.01); *G06V 20/52* (2022.01); *G06V 20/58* (2022.01); *G06V 20/59* (2022.01); *B60R 25/305* (2013.01)

(58) Field of Classification Search
CPC ....... B60R 25/31; B60R 25/01; B60R 25/102; B60R 25/24; B60R 25/305; B60R 16/023; B60H 1/00792; G06V 10/764; G06V 20/52; G06V 20/58; G06V 20/59; G06V 10/754
USPC ......................................................... 701/36
See application file for complete search history.

(56) References Cited

U.S. PATENT DOCUMENTS 10,115,029 B1\* 10/2018 Day ..................... G06V 20/59
10,303,961 B1\*  5/2019 Stoffel .................. H04W 4/44
(Continued)

FOREIGN PATENT DOCUMENTS

| CN | 103118670 A | 12/2013 |
|---|---|---|
| CN | 105151001 A \* | 12/2015 |

(Continued)

*Primary Examiner* — Jelani A Smith
*Assistant Examiner* — George A Alcorn, III
(74) *Attorney, Agent, or Firm* — Frank Lollo; Brooks Kushman P.C.

(57) ABSTRACT

Upon detecting an absence of a user inside a passenger cabin of a vehicle, an object inside the passenger cabin is classified as one of preferred or nonpreferred. Upon classifying the object as preferred, a sensor is activated to monitor an environment outside the passenger cabin based on determining the object is visible from outside the passenger cabin. A priority level for the preferred object is determined based on data from the sensor, wherein the priority level is one of high or low. A vehicle component is actuated to reduce the priority level based on determining the priority level for the preferred object is high.

20 Claims, 7 Drawing Sheets

(51) Int. Cl.
  *G06V 20/52* (2022.01)
  *G06V 20/58* (2022.01)
  *G06V 20/59* (2022.01)
  *B60R 25/30* (2013.01)

(56) References Cited

U.S. PATENT DOCUMENTS

| | | | |
|---|---|---|---|
| 10,872,253 B2 | 12/2020 | Qiu et al. | |
| 2003/0038712 A1* | 2/2003 | Pelletier | B60R 21/01566 |
| | | | 340/425.5 |
| 2020/0156488 A1* | 5/2020 | Tsukamoto | H02J 50/10 |
| 2020/0160075 A1 | 5/2020 | Muiter et al. | |
| 2020/0290567 A1* | 9/2020 | Funyak | B60R 25/102 |
| 2021/0096572 A1* | 4/2021 | Jang | G06N 3/08 |
| 2022/0189282 A1* | 6/2022 | Hedges | G08B 21/182 |
| 2022/0284792 A1* | 9/2022 | Gerrese | H04W 4/48 |
| 2022/0388476 A1* | 12/2022 | Weber, Jr. | B60R 25/1004 |

FOREIGN PATENT DOCUMENTS

| | | | |
|---|---|---|---|
| GB | 2421621 B | | 5/2007 |
| JP | 2004220224 A | * | 8/2004 |
| JP | 2005220635 A | * | 8/2005 |
| KR | 20070019167 A | * | 2/2007 |
| KR | 20140073672 A | * | 6/2014 |
| KR | 20190110193 A | * | 9/2019 |

* cited by examiner

VEHICLE SENSOR CONTROL FOR OPTIMIZED MONITORING OF PREFERRED OBJECTS WITHIN A VEHICLE PASSENGER CABIN

BACKGROUND

A vehicle can be equipped with electronic and electromechanical components, e.g., computing devices, networks, sensors, and controllers, etc. A vehicle computer can acquire data regarding the vehicle's environment and can operate the vehicle or at least some components thereof based on the acquired data. Vehicle sensors can provide data concerning routes to be traveled and objects in the vehicle's environment. Monitoring of the vehicle can rely upon acquiring accurate and timely data regarding objects in a vehicle's environment while the vehicle is traveling along a route or stopped at a waypoint on the route.

DETAILED DESCRIPTION

Figure 1:
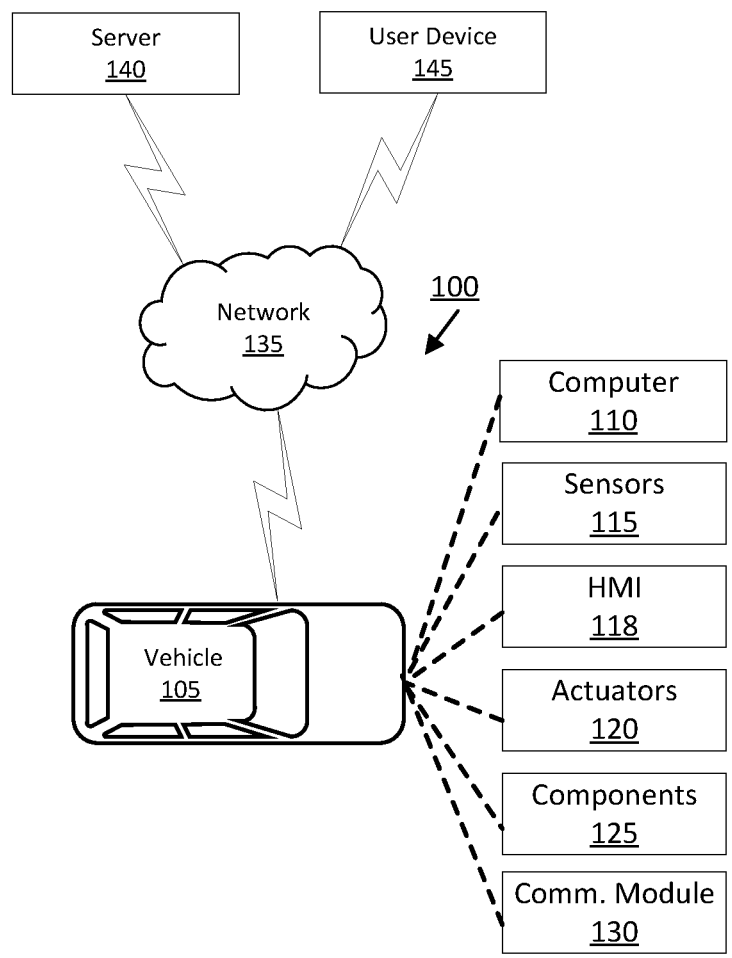
FIG. 1 is a block diagram illustrating an example vehicle control system for a vehicle.

Advantageously, as described herein, a vehicle computer can provide an energy-efficient way to monitor a vehicle interior. Leaving a vehicle in an ON state allows one or more sensors to draw power from a battery to monitor the object (s) remaining in the vehicle, which can increase power consumption from the battery, thereby preventing the battery from having a sufficient state of charge to power other vehicle components. Leaving the vehicle in an OFF state reduces power consumption by the sensor(s) by preventing the sensor(s) from drawing power from the battery. However, when the vehicle is in the OFF state, the sensor(s) are unable to monitor the object(s) remaining in the vehicle.

To provide the energy-efficient monitoring, a vehicle computer can classify objects in a passenger cabin of a vehicle upon detecting an absence of a user in the passenger cabin. The vehicle computer can then activate a sensor to monitor the environment around the vehicle based on the classification of the object and determining that the object is visible from outside the vehicle. Selectively activating the sensor to monitor the environment around the vehicle can prevent or reduce power consumption by the sensor, thereby reducing power consumed from the battery.

A system, comprising a computer including a processor and a memory, the memory storing instructions executable by the processor programmed to, upon detecting an absence of a user inside a passenger cabin of a vehicle, classify an object inside the passenger cabin as one of preferred or nonpreferred. The instructions further include instructions to, upon classifying the object as preferred, activate a sensor to monitor an environment outside the passenger cabin based on determining is visible from outside the passenger cabin. The instructions further include instructions to determine a priority level for the preferred object based on data from the sensor, wherein the priority level is one of high or low. The instructions further include instructions to actuate a vehicle component to reduce the priority level based on determining the priority level for the preferred object is high.

The instructions can further include instructions to, upon classifying the object as preferred, provide the classification to a remote computer.

The instructions can further include instructions to, upon determining the priority level for the preferred object is high, provide the priority level to a remote computer.

The instructions can further include instructions to determine the priority level is high for the preferred object based on identifying an unauthorized user within a threshold area around the vehicle via the data from the sensor.

The instructions can further include instructions to, upon detecting a non-movable object outside the passenger cabin and within the threshold area, update the threshold area based on the non-moveable object.

The instructions can further include instructions to actuate the vehicle component based additionally on the unauthorized user.

The instructions can further include instructions to, while the vehicle is in a minimal power state, activate a first sensor positioned to face the passenger cabin and detect the object based on data from the first sensor.

The instructions can further include instructions to, upon detecting the object via the data from the first sensor, activate a second sensor positioned to face the passenger cabin, wherein the second sensor has a higher power draw than the first sensor.

The instructions can further include instructions to classify the object based on data from the second sensor.

The instructions can further include instructions to determine the priority level for the preferred object is high based on detecting a temperature of the preferred object being outside of a temperature range.

The instructions can further include instructions to determine the temperature range based on the preferred object.

The instructions can further include instructions to actuate the vehicle component based additionally on the temperature of the preferred object.

The instructions can further include instructions to, upon detecting the object inside the passenger cabin, provide a request to a remote computer.

The instructions can further include instructions to classify the object based on a response received from the remote computer in response to the request.

The instructions can further include instructions to, upon classifying the object as preferred, provide a message to a remote computer identifying an updated storage position for the preferred object inside the passenger cabin.

The vehicle component can be one of a lighting component, a propulsion component, a climate control component, a lock component, or a window component.

A method includes, upon detecting an absence of a user inside a passenger cabin of a vehicle, classifying an object inside the passenger cabin as one of preferred or nonpreferred. The method further includes, upon classifying the object as preferred, activating a sensor to monitor an environment outside the passenger cabin based on determining is visible from outside the passenger cabin. The method further includes determining a priority level for the preferred object based on data from the sensor, wherein the priority level is one of high or low. The method further includes actuating a vehicle component to reduce the priority level based on determining the priority level for the preferred object is high.

The method can further include determining the priority level is high for the preferred object based on detecting a moveable object within a threshold area around the vehicle via the data from the sensor.

The method can further include determining the priority level for the preferred object is high based on detecting a temperature of the preferred object being outside of a temperature range.

The vehicle component can be one of a lighting component, a propulsion component, a climate control component, a lock component, or a window component.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4B, an example vehicle control system 100 includes a vehicle 105. A vehicle computer 110 in the vehicle 105 receives data from sensors 115, including a first sensor 115a and a second sensor 115b. The vehicle computer 110 is programmed to upon detecting an absence of a user inside a passenger cabin 300 of the vehicle 105, classify an object 305 inside the passenger cabin 300 as one of preferred or nonpreferred. The vehicle computer 110 is further programmed to, upon classifying the object 305 as preferred, activate the first sensor 115a to monitor an environment outside the passenger cabin 300 based on determining the object 305 is visible from outside the passenger cabin 300. The vehicle computer 110 is further programmed to determine a priority level for the preferred object 305 based on data from the first sensor 115a. The priority level is one of high or low. The vehicle computer 110 is further programmed to actuate a vehicle component 125 to reduce the priority level based on determining the priority level for the preferred object 305 is high.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to-infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC (application specific integrated circuit) that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, etc.

Figure 2:
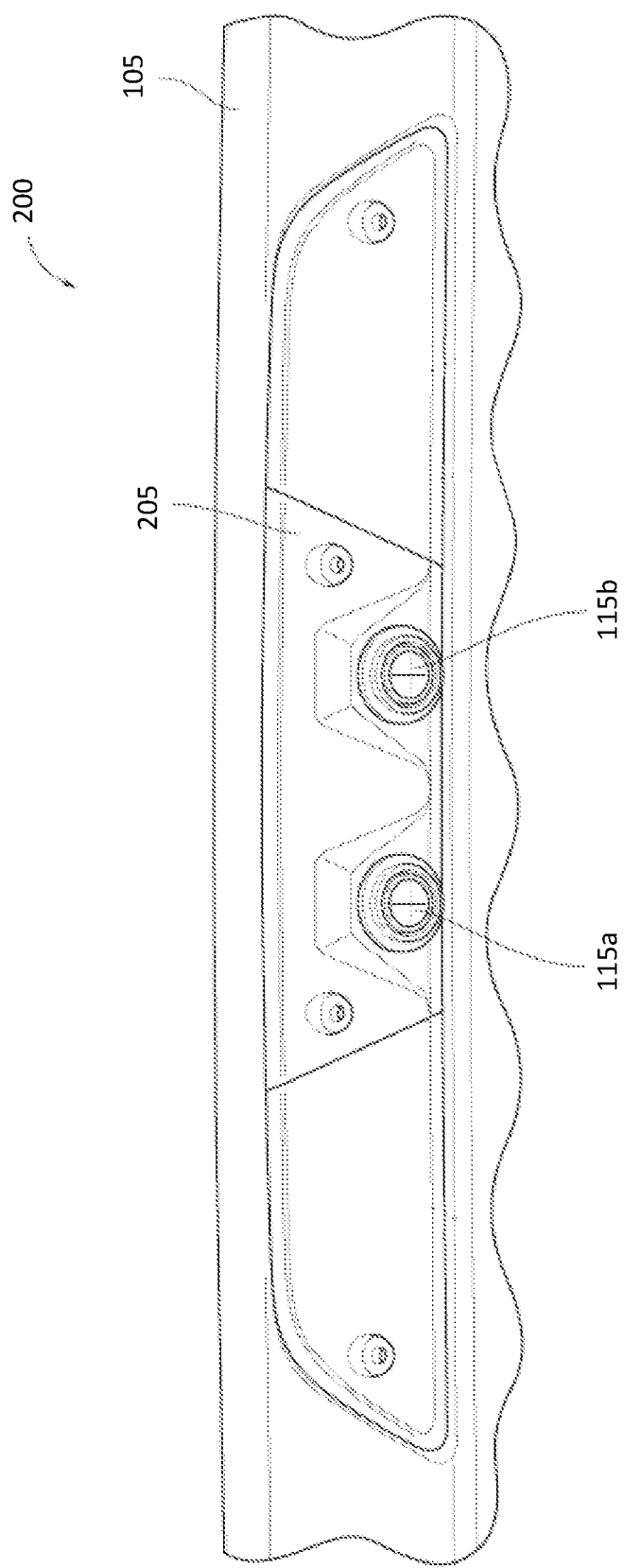
FIG. 2 is a plan view of a sensor assembly including first and second sensors.

Turning now to FIG. 2, the vehicle 105 may include one or more sensors 115 and one or more sensor assemblies 200 in which sensors 115 can be mounted, such as the illustrated sensor assembly 200. The sensor assembly 200 includes a housing 205, a first sensor 115a, and a second sensor 115b. The housing 205 may be mounted, e.g., via fasteners, welding, adhesive, etc., to the vehicle 105. As illustrated in FIG. 3, the vehicle 105 may include a plurality of sensor assemblies 200 that are positioned to monitor an environment around the vehicle 105, i.e., external sensor assemblies 200a, and a plurality of sensor assemblies 200 that are positioned to monitor a passenger cabin 300 of the vehicle 105, i.e., internal sensor assemblies 200b.

The housing 205 retains the first sensor 115a and the second sensor 115b. The first sensor 115a in the present example is a type suitable for detecting objects, e.g., in an environment around the vehicle 105. In particular, the first sensor 115a can be a radar. A radar, as is known, uses radio waves to determine the relative location, angle, and/or velocity of an object by tracking the time required for the radio waves generated by the radar to reflect back to the radar. Alternatively, the first sensor 115a can be an ultrasonic sensor, a UWB transceiver, or any other suitable type of sensor. The first sensor 115a runs at a scanning rate, which is an occurrence interval of generating and transmitting the radio waves, e.g., twice per second, once every two seconds, etc. The power draw, i.e., the rate of power consumption, of the first sensor 115a depends on the scanning rate, i.e., typically is higher for higher scanning rates.

The second sensor 115b in the present example is a type suitable for providing data about the environment around the vehicle 105. For example, the second sensor 115b can be a camera. A camera, as is known, detects electromagnetic radiation in some range of wavelengths. For example, the camera may detect visible light, infrared radiation, ultraviolet light, or some range of wavelengths including visible, infrared, and/or ultraviolet light. The power draw of the second sensor 115b in the present example is higher than the power draw of the first sensor 115a for any scanning rate of the first sensor 115a. Alternatively, the second sensor 115b can be an ultrasonic sensor, a UWB transceiver, or any other suitable type of sensor.

The first sensor 115a and the second sensor 115b can be arranged in the housing 205 so that respective fields of view of the first sensor 115a and the second sensor 115b at least partially overlap. For example, fields of view of the first and second sensors 115a, 115b may be identical. The fields of view of the first and second sensors 115a, 115b include an area or, more typically, a three-dimensional space, i.e., a volume, around the vehicle 105. For example, the first and second sensors 115a, 115b can be mounted into a fixed position relative to the housing 205. The first and second sensors 115a, 115b can face in generally a same direction relative to the vehicle 105.

Figure 3A:
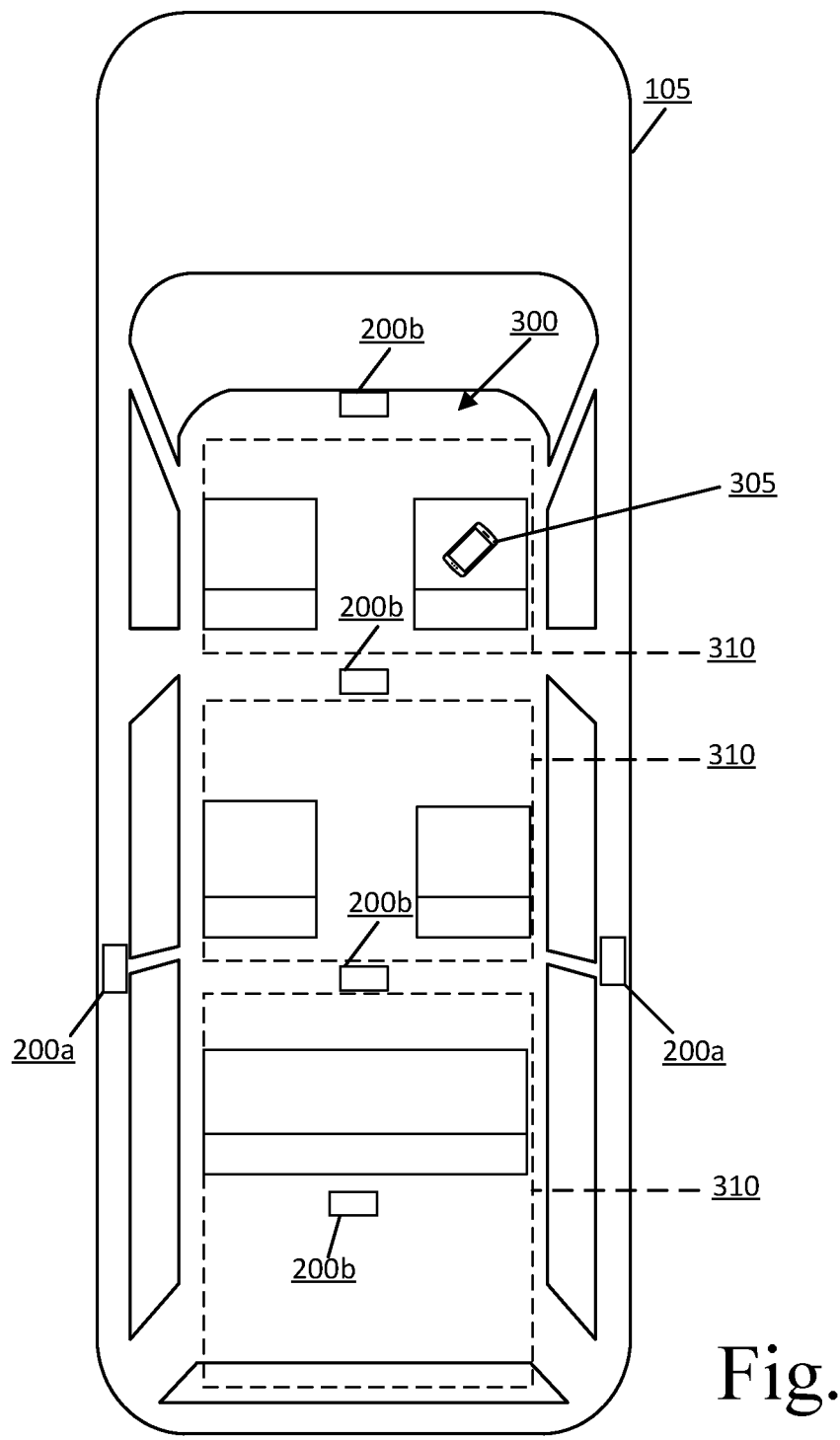
FIGS. 3A-3B are diagrams illustrating exemplary passenger cabins of the vehicle.
Figure 3B:
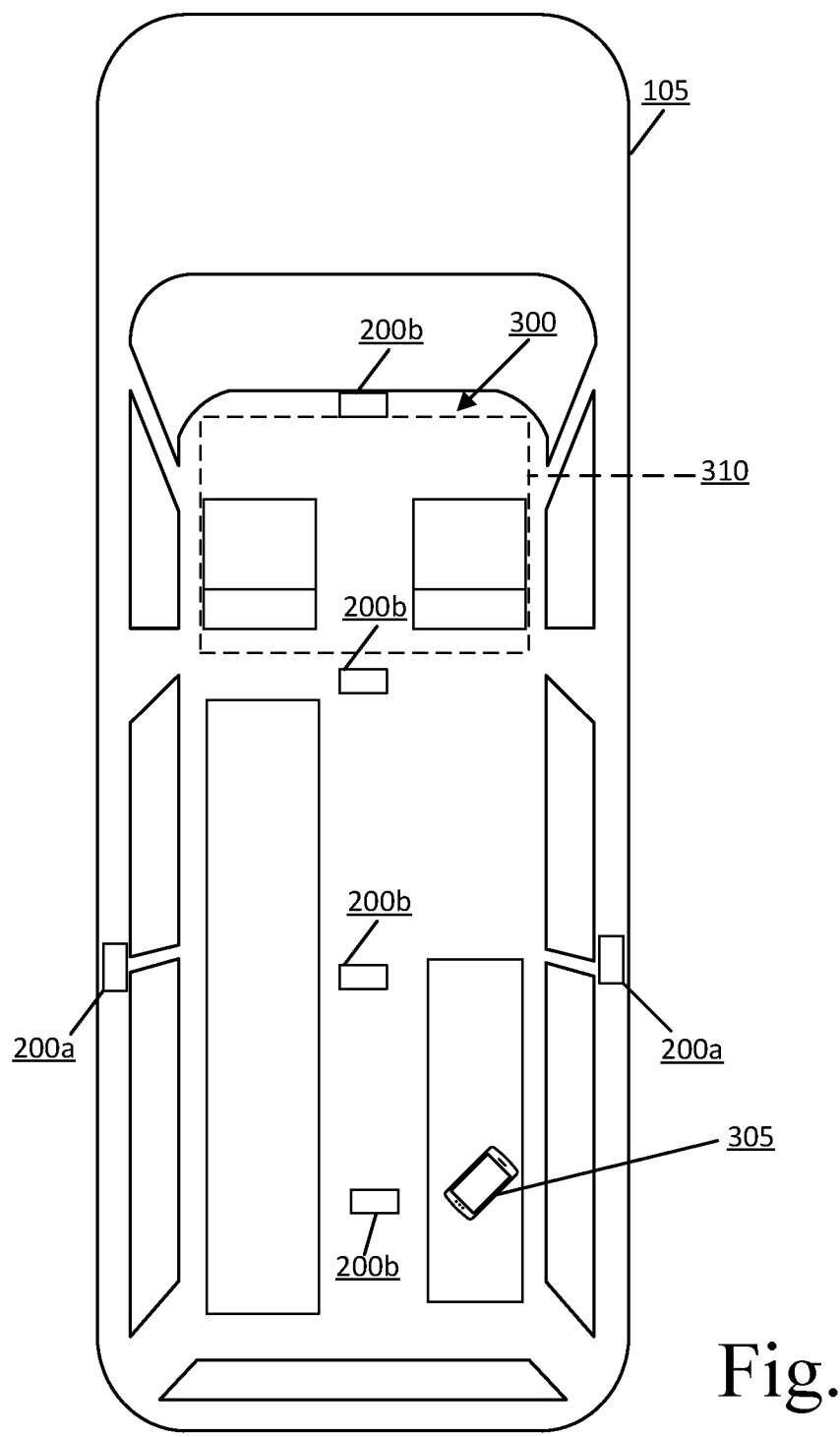

FIGS. 3A and 3B are diagrams of a top view of an example passenger cabin 300 of an example vehicle 105. The vehicle 105 may include a body (not numbered) defining the passenger cabin 300 to house users, if any, of the vehicle. The body includes doors and windows openable to allow ingress and egress from the passenger cabin 300.

The passenger cabin 300 may extend across the vehicle 105, i.e., from one side to the other side of the vehicle 105. The passenger cabin 300 includes a front end (not numbered) and a rear end (not numbered) with the front end being in front of the rear end during forward movement of the vehicle 105. The passenger cabin 300 includes one or more seats (not numbered). The seats may be arranged in any suitable arrangement. For example, the passenger cabin 300 may include one or more front seats disposed at a front of the passenger cabin 300 and one or more back seats disposed behind the front seats, as shown in FIG. 3A. The passenger cabin 300 may also include third-row seats at the rear of the passenger cabin 300, as shown in FIG. 3A. In FIG. 3A, the front seats and back seats are shown to be bucket seats and the third-row seats are shown to be bench seats, but the seats may be other types. As another example, the passenger cabin 300 may include one or more front seats disposed at a front of the passenger cabin 300 and one or more shelves, crates, bins, benches, etc. disposed behind the front seats, as shown in FIG. 3B.

The vehicle computer 110 can receive, determine, and/or store location data defining one or more zones 310 within the passenger cabin 300. The location data of the zone(s) 310 can be specified in a vehicle coordinate system, e.g., a multi-dimensional Cartesian coordinate system having a predetermined origin point included in the passenger cabin 300 of the vehicle 105. For example, the location data may represent boundaries of the zone(s) 310. In the present context, a "zone" is an area or, more typically, a three-dimensional space, i.e., a volume, that can be observed from a user outside of the passenger cabin 300, e.g., while looking through a window and/or a windshield. The vehicle computer 110 can define any suitable number of zones 310 within the passenger cabin 300. For example, the vehicle computer 110 can define a plurality of zones 310 within the passenger cabin 300, e.g., when the vehicle 105 includes windows behind the front seats, as shown in FIG. 3A. As another example, the vehicle computer 110 can define one zone 310 within the passenger cabin 300, e.g., when the vehicle 105 lacks windows behind the front seats, as shown in FIG. 3B.

The vehicle computer 110 can define a zone 310 by objects and features that occupy, surround, and/or abut the zone 310. For example, the vehicle computer 110 can define a zone 310 such that the zone 310 extends across the vehicle 105 from one window to another window and along the vehicle 105 either between a windshield (e.g., a front windshield or a rear windshield) and one row of seats or between two rows of seats. Additionally, the zone 310 may extend from a floor or a seat bottom to a roof. As another example, the vehicle computer 110 can determine one or more predetermined zones 310, e.g., stored in a memory of the vehicle computer 110 and/or received from a remote server computer 140, e.g., via the network 135. In such an example, the predetermined zone(s) 310 can be determined empirically, e.g., based on testing that allows for determining areas within a passenger cabin 300 that are visible to a user outside of the passenger cabin 300, e.g., based on vehicle parameters such as passenger cabin 300 dimensions, window dimensions, seat positions and/or dimensions, window transparency, etc. Alternatively, the vehicle computer 110 can receive a user input, e.g., via the HMI 118 or the user device 145, specifying a number and size of zones 310 within the passenger cabin 300. The zone(s) 310 may be stored, e.g., in a memory of the vehicle computer 110.

The vehicle computer 110 is programmed to manage startup and shutdown of the vehicle 105. That is, the vehicle computer 110 can transition the vehicle 105 between activation states. For example, the vehicle computer 110 can transition the vehicle 105 between activation states based on receiving a request from, e.g., the remote server computer 140, the user device 145, user input to a power button in a passenger cabin 300 of the vehicle 105, etc. In this context, an "activation state" specifies a power state of vehicle components 125 and sensors 115, i.e., whether, and/or an amount that, a component 125 and/or sensor 115 is electrically powered during startup and/or shutdown of the vehicle 105, e.g., unpowered, powered with a specific power supply, etc.

The activation state can be one of an OFF state, a minimal power state, and an ON state. In the ON state, all vehicle components 125 and sensors 115 are available to be actuated by the vehicle computer 110 to operate the vehicle 105. In the OFF state, the vehicle components 125 and sensors 115 are substantially powered off to conserve energy when the vehicle 105 is not in use. In the minimal power state, vehicle components 125 and/or sensors 115 may draw power from a power supply for less than all operation when the vehicle 105 is in the ON state. That is, the vehicle components 125 and/or sensors 115 draw power for a specific, limited set of operations, e.g., monitoring the environment around the vehicle 105.

The power supply provides electricity to one or more components 125 and sensors 115. The power supply can include one or more batteries, e.g., 12-volt lithium-ion batteries, and one or more power networks to supply power from the batteries to the components 125 and sensors 115. In the ON state, the power supply provides power to all of the vehicle components 125 and sensors 115. In the minimal power state, the power supply may provide power to a subset, i.e., some but less than all, of the vehicle components 125 and sensors 115. For example, the power supply may provide power to the sensors 115 but not to the vehicle components 125. In the OFF state, the power supply does not provide power to the vehicle components 125 or sensors 115. The vehicle computer 110 can receive power from the power supply regardless of the activation state. The vehicle computer 110 can actuate the power supply based on the activation state.

While in the ON state, the vehicle computer 110 can receive sensor 115 data, e.g., image data, of the passenger cabin 300. That is, the vehicle computer 110 can receive data from a sensor 115 positioned to face the passenger cabin 300, e.g., a second sensor 115b of an internal sensor assembly 200b. The sensor 115 data can include one or more objects 305 in the passenger cabin 300. The vehicle computer 110 can determine a presence or an absence of a user in the passenger cabin 300 based on the sensor 115 data. For example, object identification techniques can be used, e.g., in the vehicle computer 110 based on LIDAR sensor 115 data, camera sensor 115 data, etc., to identify a type of object 305, e.g., a user, a user device 145, a purse, a wallet, etc., as well as physical features of objects 305.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Upon determining the absence of the user in the passenger cabin 300, the vehicle computer 110 may be programmed to transition the vehicle 105 from the ON state to the minimal power state. Additionally, or alternatively, the vehicle computer 110 may be programmed to transition the vehicle 105 to the minimal power state based on receiving a message from the remote server computer 140 or the user device 145, e.g., via the network 135.

The vehicle computer 110 is programmed to detect whether an object 305 remains in the passenger cabin 300 when the vehicle is in the minimal power state. For example, the vehicle computer 110 may activate a first sensor 115a of an internal sensor assembly 200b mounted to the vehicle 105 and positioned to face the passenger cabin 300. The vehicle computer 110 can instruct the first sensor 115a of the internal sensor assembly 200b to run at a scanning rate. The scanning rate may be determined empirically, e.g., based on determining a scanning rate that allows a first sensor 115a to detect an object 305 in the field of view of the first sensor 115a while minimizing the power draw of the first sensor 115a.

As another example, the vehicle computer 110 may be programmed to transmit, e.g., via a short-range broadcast protocol, a radio frequency (RF) signal, e.g., BLE, Ultra-Wideband (UWB), etc. The vehicle computer 110 can then detect the object 305 based on detecting either the return of the respective transmitted RF signal or a response RF signal transmitted from the object 305, e.g., continuously or in response to detecting the RF signal transmitted by the vehicle computer 110. Upon detecting the object 305, the vehicle computer 110 can determine a location of the object 305. The object 305 can transmit, e.g., via the network 135, location data, e.g., geo-coordinates, of the object 305 to the vehicle computer 110. Upon receiving the location data of the object 305, the vehicle computer 110 can use the location data to establish a GPS-based geo-fence. A geo-fence herein has the conventional meaning of a boundary for an area defined by sets of geo-coordinates. In such an example, the geo-fence specifies a perimeter of the passenger cabin 300. The vehicle computer 110 can then determine that the object 305 is within the passenger cabin 300 based on the location data of object 305 indicating the object 305 is within the geo-fence.

Additionally, the vehicle computer 110 determines whether a detected object 305 is within a zone 310, i.e., visible from outside the passenger cabin 300, e.g., through a window or windshield. For example, at least some of the internal sensor assemblies 200b may be arranged to monitor one respective zone 310, i.e., positioned to obtain data from one respective zone 310. That is, at least some of the first sensors 115a may be arranged such that fields of view of the at least some first sensors 115a include one respective zone 310, and other first sensors 115a may be arranged such that fields of view of the other first sensors 115a do not include any zones 310. In such an example, the vehicle computer 110 can determine the identified object 305 is outside of a zone 310 based on detecting the identified object 305 via data from a first sensor 115a that does not face, i.e., have a field of view including, the zone 310. Similarly, the vehicle computer 110 can determine the identified object 305 is in a zone 310 based on detecting the identified object 305 via data from a first sensor 115a that faces the zone 310.

As another example, the vehicle computer 110 can determine whether the detected object 305 is within a zone 310 based on determining, via the data from a first sensor 115a that faces the zone 310, a position of the identified object 305 relative to the first sensor 115a, e.g., using known data processing techniques, e.g., image processing techniques. The vehicle computer 110 can then compare the position of the detected object 305 to location data indicating a boundary of the zone 310, e.g., specified in a vehicle coordinate system and stored in a memory of the vehicle computer 110. The vehicle computer 110 can determine that the detected object 305 is within the zone 310 based on the position of detected object 305 being within the boundary of the zone 310.

Upon detecting the object 305 in the passenger cabin 300 and determining the object 305 is within a zone 310, the vehicle computer 110 activates the second sensor 115b of the internal sensor assembly 200b facing the zone 310 in which the detected object 305 has been detected. The vehicle computer 110 can verify an identification of the object 305 based on data from the second sensor 115b, e.g., according to the object identification techniques discussed above. That is, in the ON state, the vehicle computer 110 can identify objects 305 in the passenger cabin 300 when the vehicle computer 110 determines the absence or presence of the user in the passenger cabin 300, and, in the minimal power state, the vehicle computer 110 can verify the identified objects 305 in the passenger cabin 300. The vehicle computer 110 may be programmed to, upon verifying the identified object 305, provide a message specifying an identification of the object 305 to the remote server computer 140 or the user device 145, e.g., via the network 135.

Additionally, the vehicle computer 110 determines a classification for the identified object 305 based on the data from the second sensor 115*b*. For example, object classification techniques can be used, e.g., in the vehicle computer 110 based on LIDAR sensor 115 data, camera sensor 115 data, etc., to classify a detected object 305. Each identified object 305 can be classified as preferred or nonpreferred. A "preferred" object is an object that is to be safeguarded, and a "nonpreferred" object is an object that is not to be safeguarded.

Any suitable techniques may be used to classify objects 305 based on sensor 115 data. For example, the classifier may be further trained to output a classification for one or more objects 305. Thus, in addition to identifying the object(s) 305, the classifier can output a classification for the object(s) 305. Once trained, the classifier can accept as input, the vehicle sensor 115 data, e.g., an image, and then provide as output, for each of one or more respective regions of interest in the image, a classification for the identified objects 305.

As another example, the vehicle computer 110 can determine the classification for the identified object 305 based on a look-up table, or the like, that associates various objects 305 with corresponding classifications. For example, upon determining the absence of the user in the passenger cabin 300, the vehicle computer 110 can access the look-up table and retrieve the respective classifications for the corresponding identified object(s) 305 in the passenger cabin 300. The vehicle computer 110 may be programmed to, upon determining the classification for the identified object 305, provide a message specifying the classification of the identified object 305 to the remote server computer 140 or the user device 145, e.g., via the network 135.

Alternatively, the vehicle computer 110 can receive the classification for the identified object 305 from a remote server computer 140 or the user device 145, e.g., via the network 135. In such an example, the vehicle computer 110 may provide a request for a classification of an identified object 305 to the remote server computer 140 or the user device 145, e.g., via the network 135. The vehicle computer 110 may then receive a response specifying the classification in response to the request, e.g., via the network 135. In this situation, the remote server computer 140 or the user device 145 can determine the classification for the identified object 305 based on a look-up table that associates various objects 305 with corresponding classifications, as just discussed.

The vehicle computer 110 can, for example, generate the look-up table based on receiving a user input while in the ON state. That is, the vehicle computer 110 can generate the look-up table prior to transitioning to the minimal power state. For example, upon identifying an object 305 in the passenger cabin 300 while in the ON state, the vehicle computer 110 can actuate the HMI 118 to display, e.g., via a touchscreen display, a representation of the identified object 305. The vehicle computer 110 may then actuate the HMI 118 to detect the user input specifying a classification for the identified object 305. For example, the HMI 118 may be actuated and/or instructed by the vehicle computer 110 to display virtual buttons, e.g., in addition to the representation of the identified object 305, that the user can select to specify the classification of the identified object 305. In other words, the HMI 118 may activate sensors 115 that can detect the user specifying the classification of the identified object 305. Upon detecting the user input, the vehicle computer 110 can associate the identified object 305 with the corresponding classification in the look-up table. Alternatively, the vehicle computer 110 can receive the look-up table from the remote server computer 140, e.g., via the network 135.

While remaining in the minimal power state, the vehicle computer 110 deactivates the second sensor 115*b* of the internal sensor assembly 200*b* upon determining that the object 305 in the zone 310 is classified as nonpreferred. For example, the vehicle computer 110 may initiate a timer. The timer may have a predetermined duration, e.g., 5 seconds, 30 seconds, 1 minute, etc. The predetermined duration may be stored, e.g., in a memory of the computer. If the vehicle computer 110 fails to detect another object 305 within the zone 310 via data from the second sensor 115*b* prior to expiration of the timer, then the vehicle computer 110 can deactivate the second sensor 115*b*. If the vehicle computer 110 detects another object within the zone 310 via data from the second sensor 115*b* prior to expiration of the timer, then the vehicle computer 110 maintains the second sensor 115*b* as activated. Deactivating the second sensor 115*b* upon expiration of the timer may allow the vehicle computer 110 to detect an object 305 that was previously obscured from the second sensor 115*b*, e.g., due to changes in lighting conditions, e.g., from sunlight, streetlights, headlights, etc., in the environment around the vehicle 105.

Upon determining that the object 305 in the zone 310 is classified as preferred, the vehicle computer 110 monitors an environment around the vehicle 105. For example, the vehicle 105 may include the plurality of external sensor assemblies 200*a*, as set forth above. The external sensor assemblies 200*a* may be mounted to the vehicle 105 and positioned to face the environment around the vehicle 105. That is, the first and second sensors 115*a*, 115*b* of the external sensor assemblies 200*a* may be arranged such that fields of view of the first and second sensors 115*a*, 115*b* include the environment around the vehicle 105.

The vehicle computer 110 can activate a first sensor 115*a* of an external sensor assembly 200*a* and instruct the first sensor 115*a* of the external sensor assembly 200*a* to run at a scanning rate. The vehicle computer 110 can detect objects 315 around the vehicle 105 based on data from the first sensor 115*a*. For example, the vehicle computer 110 can monitor data from the first sensor 115*a* to detect an object 315 has moved into the field of view of the first sensor 115*a*, e.g., based on determining that radio waves in some direction indicate a shorter distance than previous radio waves in that direction.

Upon detecting an object 315 around the vehicle 105, the vehicle computer 110 can determine a distance from the object 315 to the vehicle 105 based on the data from the first sensor 115*a* of the external sensor assembly 200*a*. For example, the first sensor 115*a* can measure an amount of time elapsed from emitting a radio wave to receiving the radio wave reflected from the object 315. Based on the time elapsed and a speed of light, the vehicle computer 110 can determine the distance between the vehicle 105 and the object 315.

Figure 4A:
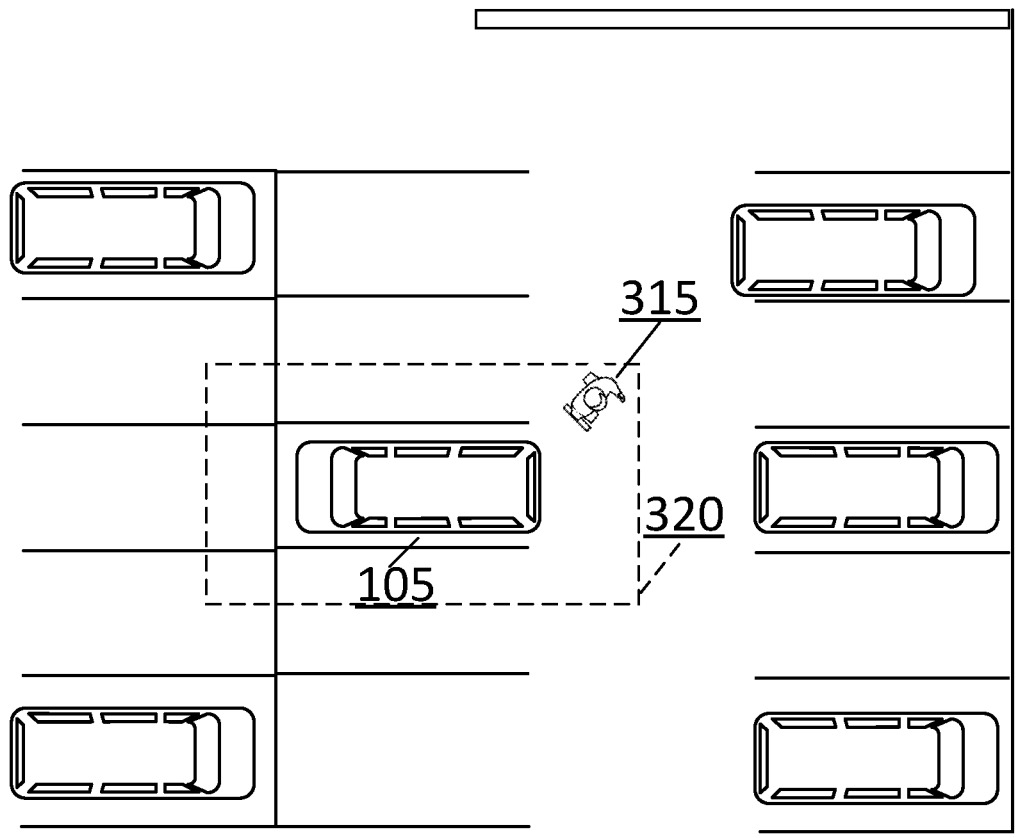
FIGS. 4A-4B are diagrams illustrating exemplary threshold areas around the vehicle.

The vehicle computer 110 can then determine that the object 315 is within a threshold area 320 of the vehicle 105 based on the distance. For example, the vehicle computer 110 may be programmed to determine that the object 315 is within the threshold area 320, e.g., by GPS-based geofencing (as discussed above). In such an example, a geofence specifies a perimeter of the threshold area 320. The vehicle computer 110 can then determine that the object 315 is within the threshold area 320 based on the distance indicating the object 315 is within the corresponding geofence, as shown in FIG. 4A. The threshold area 320 may, for example, be determined empirically, e.g., based on testing that allows for determining an area around a vehicle 105 within which objects 305 in the passenger cabin 300 can be observed through a window or windshield. As another example, the threshold area 320 may be specified by a user input, e.g., the HMI 118 can actuate sensors 115 to detect the user specifying the threshold area 320 around the vehicle 105.

If the object 315 is outside the threshold area 320, then the vehicle computer 110 can ignore the object 315. If the object 315 is inside the threshold area 320, then the vehicle computer 110 activates the second sensor 115b of the external sensor assembly 200a. The vehicle computer 110 can then identify the detected object 315 based on data from the second sensor 115b. For example, the vehicle computer 110 can be programmed to classify and/or identify object(s) based on data from the second sensor 115b. For example, object classification techniques, as discussed above, can be used to classify a detected object 315 as mobile, i.e., moveable, or stationary, i.e., non-movable. Additionally, or alternatively, object identification techniques, as discussed above, can be used to identify a type of the detected object 315, e.g., a user, an animal, a shopping cart, a pole, a wall, foliage, etc.

Upon identifying the type of object 315 as a user, the vehicle computer 110 determines whether the user is authorized or unauthorized based on the data from the second sensor 115b. An authorized user has permission to access the passenger cabin 300. An unauthorized user lacks permission to access the passenger cabin 300. For example, the vehicle computer 110 can perform facial recognition to determine whether the user's face is an authorized face, i.e., a face of a known authorized person, e.g., stored in a memory. The vehicle computer 110 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc.

Additionally, or alternatively, upon determining that the object 305 is classified as preferred and is in a zone 310, the vehicle computer 110 can be programmed to determine an updated storage position for the preferred object 305 inside the passenger cabin 300. For example, the vehicle computer 110 can store, e.g., in a memory of the vehicle computer 110, a look-up table that associates various objects 305 with corresponding storage positions. The look-up table may associate objects 305 with storage positions having dimensions, e.g., length, width, and height, that are greater than the corresponding dimensions for the object 305, which allows the storage positions to conceal the corresponding objects 305. The vehicle computer 110 can access the look-up table and select a storage position associated with the preferred object 305. The vehicle computer 110 can, for example, provide a message to the user device 145 identifying the updated storage position, e.g., via the network 135. As used here, a "storage position" is a position within the passenger cabin 300 in which an object 305 can be, at least partially, concealed from view. Non-limiting examples of storage positions include a glove box, under a seat, in a seat pouch, under a floor mat, etc.

Figure 4B:
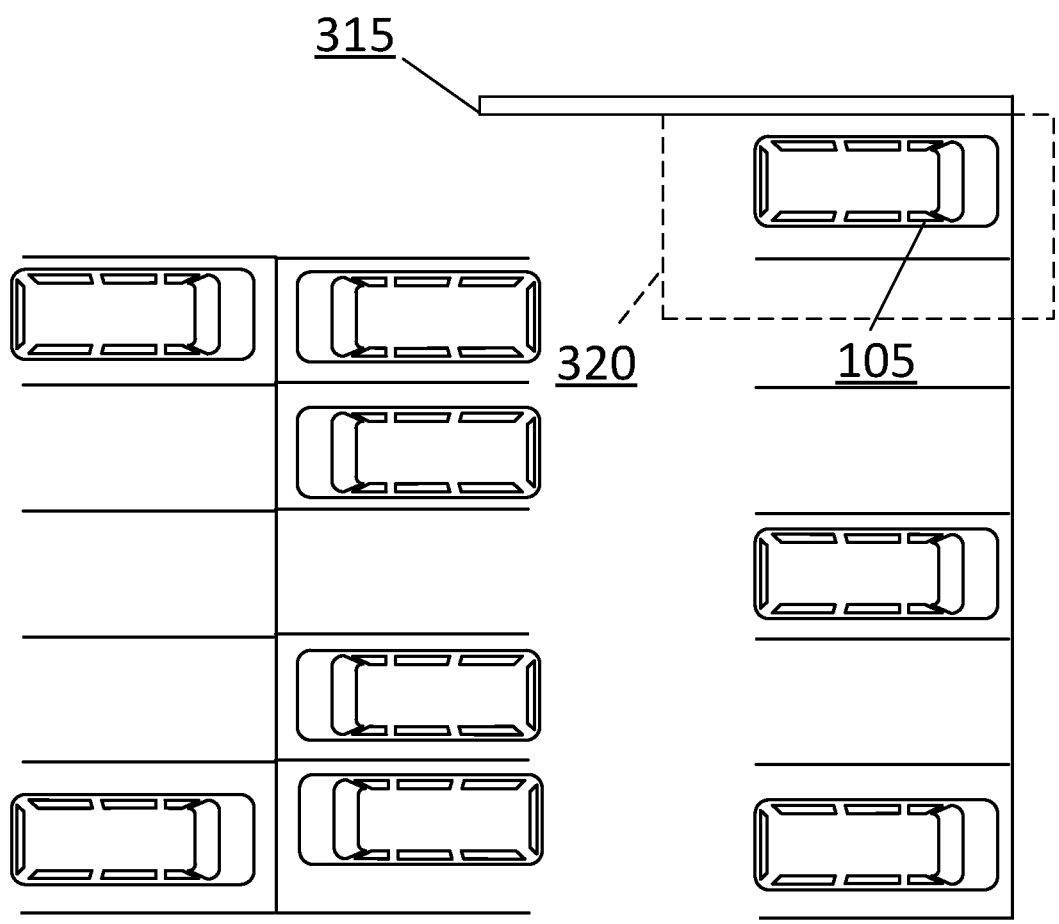

Upon determining a classification for the object 315 (which in the example shown in FIG. 4B is a wall) is non-movable, the vehicle computer 110 can update the threshold area 320. For example, the vehicle computer 110 can update the threshold area 320 to extend from the vehicle 105 to the non-movable object 315, as shown in FIG. 4B. That is, the vehicle computer 110 can update the threshold area 320 such that the non-movable object 315 is outside of the threshold area 320. Updating the threshold area 320 to not include non-movable objects 315 can conserve energy by allowing the vehicle computer 110 to ignore a non-movable object 315 and any objects beyond the non-movable object 315, which may be obstructed from viewing objects 305 in the passenger cabin 300 by the non-movable object 315.

The vehicle computer 110 is programmed to determine a priority level for the preferred object 305 in the passenger cabin 300. As used herein, a "priority level" is a measure that the vehicle computer 110 can use to determine whether to actuate vehicle components 125 based on a threat to a preferred object 305. The priority level may be specified as a text string, e.g., "high" or "low", a binary variable (0 or 1), etc. The vehicle computer 110 may be programmed to, upon determining the priority level for the preferred object 305, provide a message specifying the priority level for the preferred object 305 to the remote server computer 140 or the user device 145, e.g., via the network 135.

The vehicle computer 110 can, for example, determine the priority level for the preferred object 305 based on the object 315 outside the passenger cabin 300. For example, the vehicle computer 110 can determine that the priority level for the preferred object 305 is "high" based on identifying the object 315 outside the passenger cabin 300 as an unauthorized user. As another example, the vehicle computer 110 can determine that the priority level for the preferred object 305 is "low" based on identifying the object 315 outside the passenger cabin 300 as a type of object other than an unauthorized user, e.g., an authorized user, an animal, a non-movable object, etc.

Additionally, or alternatively, the vehicle computer 110 can determine the priority level for the preferred object 305 based on temperature data. For example, the vehicle computer 110 can obtain temperature data for the passenger cabin 300 and/or the preferred object 305, e.g., via a thermocouple, a thermal camera, etc. mounted in the passenger cabin 300 and positioned to face the preferred object 305. The vehicle computer 110 can compare the temperature data for the passenger cabin 300 and/or the preferred object 305 to a temperature range. The temperature range may be determined empirically, e.g., based on testing that allows for determining various temperature ranges that prevent damage to corresponding preferred objects 305 from thermal loading. For example, the vehicle computer 110 can store, e.g., in a memory of the vehicle computer 110, a look-up table that associates various temperature ranges with various types of objects 305. The vehicle computer 110 can access the look-up table to select a temperature range that is associated with the type of preferred object 305. If the temperature data is within the temperature range, then the vehicle computer 110 can determine the priority level is "low". If the temperature data is outside the temperature range, then the vehicle computer 110 can determine the priority level is "high".

Upon determining that the priority level is "low", the vehicle computer 110 may be programmed to deactivate the second sensor 115b of the external sensor assembly 200a. For example, the vehicle computer 110 may initiate the timer. If the vehicle computer 110 fails to detect another object 315 within the threshold area 320 via data from the second sensor 115b prior to expiration of the timer, then the vehicle computer 110 can deactivate the second sensor 115b. If the vehicle computer 110 detects another object 315 within the threshold area 320 via data from the second sensor 115b prior to expiration of the timer, then the vehicle computer 110 maintains the second sensor 115b as activated.

Upon determining that the priority level is "high", the vehicle computer 110 can transition the vehicle 105 from the minimal power state to the ON state. Upon transitioning the vehicle 105 to the ON state, the vehicle computer 110 actuates one or more vehicle components 125 to reduce the priority level. Additionally, or alternatively, the vehicle computer 110 may provide a message, e.g., via the network 135, to the remote server computer 140 or the user device 145 indicating a priority level is "high". For example, the vehicle computer 110 can determine to whether to provide the message, e.g., in the same manner as discussed above regarding determining the classification for the object 305. For example, the vehicle computer 110 can determine whether to the spend the message based on the look-up table associating a determination to send the message with the identified object 305. In this situation, the vehicle computer 110 can update the look-up table to associate the determination with the identified object 305 based on receiving a second user input, e.g., via the HMI 118, specifying the determination. As another example, the vehicle computer 110 can receive instructions from the remote server computer 140 or the user device 165 specifying whether to send the message or to not send the message based on the object 305. The vehicle computer 110 may store the message, e.g., in a memory.

The vehicle computer 110 can actuate one or more subsets, i.e., some but less than all, of the vehicle components 125 to reduce a priority level for the preferred object 305 associated with an unauthorized user. For example, upon detecting the unauthorized user within the threshold area 320, the vehicle computer 110 can actuate windows and/or doors to a closed position, actuate locks to an engaged position, in which the doors and/or windows are locked, i.e., prevented from opening even if a handle and/or a switch is operated, actuate the HMI 118 to deactivate sensors 115 such that the unauthorized user cannot provide a user input, etc., to prevent an unauthorized user from accessing the vehicle 105. Additionally, or alternatively, the vehicle computer 110 can turn off interior lights, actuate electrically controlled window tint, etc., to reduce a likelihood that an unauthorized user can observe the preferred object 305 from outside the passenger cabin 300. As another example, upon determining that the unauthorized user is attempting to enter the passenger cabin 300, e.g., based on detecting a door handle being operated, the vehicle computer 110 can actuate one or more vehicle components 125, e.g., speakers, a display, a horn, exterior lights, etc., to output an alert. Additionally, or alternatively, the vehicle computer 110 can actuate one or more vehicle components 125 to move the vehicle 105 to a new location away from the unauthorized user.

Additionally, or alternatively, the vehicle computer 110 can actuate one or more subsets, i.e., some but less than all, of the vehicle components 125 to reduce a priority level for the preferred object 305 associated with a temperature of the preferred object 305 (or the passenger cabin 300). For example, the vehicle computer 110 can actuate one or more vehicle components 125 to move the vehicle 105 to a new location, e.g., into a shaded area or into a sunlit area. As another example, the vehicle computer 110 can actuate a climate control system to increase or decrease the temperature within the passenger cabin 300 based on the temperature data and the temperature range.

Figure 5:
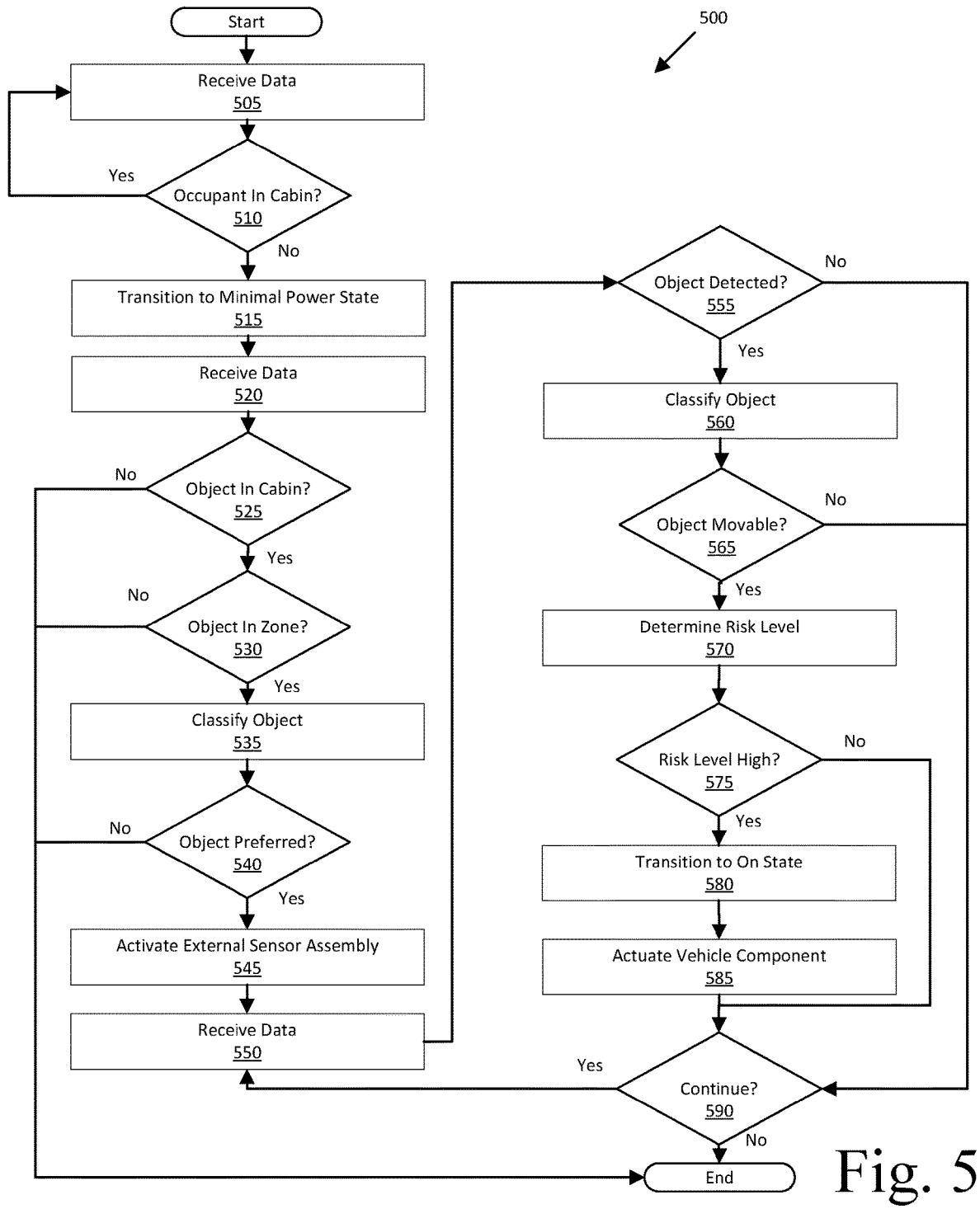
FIG. 5 is a flowchart of an example process for monitoring objects in a passenger cabin of the vehicle.

FIG. 5 is a flowchart of an example process 500 executed in a vehicle computer 110 according to program instructions stored in a memory thereof for optimizing monitoring of objects 305 in a passenger cabin 300. Process 500 includes multiple blocks that can be executed in the illustrated order. Process 500 could alternatively or additionally include fewer blocks or can include the blocks executed in different orders.

Process 500 begins in a block 505. In the block 505, the vehicle computer 110 receives data from one or more sensors 115 of respective internal sensor assemblies 200b positioned to face the passenger cabin 300. The process 500 continues in a block 510.

In the block 510, the vehicle computer 110 determines whether a user is in the passenger cabin 300. The vehicle computer 110 can determine a presence or an absence of the user in the passenger cabin 300 based on the data from the sensors 115, as discussed above. If the vehicle computer 110 determines the absence of the user in the passenger cabin 300, then the process 500 continues in a block 515. Otherwise, the process 500 returns to the block 505.

In the block 515, the vehicle computer 110 transitions the vehicle 105 to a minimal power state. In the minimal power state, the vehicle computer 110 can activate first sensors 115a of respective internal sensor assemblies 200b, as discussed above. The process 500 continues in a block 520.

In the block 520, the vehicle computer 110 receives data from the activated first sensors 115a. The process 500 continues in a block 525.

In the block 525, the vehicle computer 110 determines whether an object 305 is in the passenger cabin 300. The vehicle computer 110 can detect the object 305 based on the data obtained from the first sensors 115a in the block 520, as discussed above. If the vehicle computer 110 detects the object 305 in the passenger cabin 300, then the process 500 continues in a block 530. Otherwise, the process 500 ends following the block 525.

In the block 530, the vehicle computer 110 determines whether the detected object 305 is in a zone 310 based on data obtained from the first sensors 115a in the block 520, as discussed above. If the vehicle computer 110 determines that the detected object 305 is in a zone 310, then the process 500 continues in a block 535. Otherwise, the process 500 ends following the block 530.

In the block 535, the vehicle computer 110 classifies the detected object 305 as one of preferred or nonpreferred. The vehicle computer 110 activates a second sensor 115b of the internal sensor assembly 200b facing the zone 310 in which the detected object 305 was detected, as discussed above. The vehicle computer 110 then obtains data from the second sensor 115b and identifies the detected object 305 based on the data from the second sensor 115b, as discussed above. The vehicle computer 110 can classify the object based on a type of the object, as discussed above. The process 500 continues in a block 540.

In the block 540, the vehicle computer 110 determines whether the identified object is preferred. If the vehicle computer 110 classifies the identified object 305 as preferred, then the process 500 continues in a block 545. Additionally, or alternatively, upon determining that the identified object 305 is preferred, the vehicle computer 110 can determine an updated storage position for the preferred object 305 and can provide the updated storage position to a user device 145, as discussed above. If the vehicle computer 110 classifies the identified object 305 as nonpreferred, the vehicle computer 110 deactivates the second sensor 115*b* of the internal sensor assembly 200*b* (as discussed above), and the process 500 ends following the block 540.

In the block 545, the vehicle computer 110 activates a first sensor 115*a* of an external sensor assembly 200*a*, e.g., to monitor an environment around the vehicle 105. The process 500 continues in a block 550.

In the block 550, the vehicle computer 110 receives data from the first sensor 115*a* of the external sensor assembly 200*a*. The process 500 continues in a block 555.

In the block 555, the vehicle computer 110 determines whether an object 315 is outside the passenger cabin 300 and within a threshold area 320. The vehicle computer 110 can detect the object 315 based on the data obtained from the first sensors 115*a* in the block 550, as discussed above. If the vehicle computer 110 detects the object 315 within the threshold area 320, then the process 500 continues in a block 560. Otherwise, the process 500 continues in a block 590.

In the block 560, the vehicle computer 110 classifies the detected object 315 as one of movable or non-movable. The vehicle computer 110 activates a second sensor 115*b* of the external sensor assembly 200*a* facing the object 315, as discussed above. The vehicle computer 110 then obtains data from the second sensor 115*b* and identifies the detected object 315 based on the data from the second sensor 115*b*, as discussed above. The vehicle computer 110 can classify the object based on a type of the object, as discussed above. The process 500 continues in a block 565.

In the block 565, the vehicle computer 110 determines whether the object 315 is movable. If the vehicle computer 110 classifies the object 315 as non-movable, then the vehicle computer 110 can update the threshold area 320 to not include the object 315, as discussed above. The process 500 then continues in the block 590. If the vehicle computer 110 classifies the object 315 as movable, then the process 500 continues in a block 570.

In the block 570, the vehicle computer 110 determines a priority level for the preferred object 305. The priority level for the preferred object 305 is one of "high" or "low", as discussed above. As discussed above, the vehicle computer 110 can then determine the priority level based on determining the object 315 is an unauthorized user of a type of object 315 other than an unauthorized user, e.g., an authorized user, an animal, etc., as discussed above Additionally, or alternatively, the vehicle computer 110 can determine the priority level for the preferred object 305 based on comparing temperature data of the preferred object 305 and/or the passenger cabin 300 to a temperature range for the preferred object 305, as discussed above. The process 500 continues in a block 575.

In the block 575, the vehicle computer 110 determines whether the priority level for the preferred object 305 is "high". If the vehicle computer 110 determines that the priority level for the preferred object 305 is "high", then the process 500 continues in a block 580. Otherwise, the process 500 continues in a block 590.

In the block 580, the vehicle computer 110 transitions the vehicle 105 to the ON state. The process 500 continues in a block 585.

In the block 585, the vehicle computer 110 actuates one or more vehicle components 125 to reduce the priority level for the preferred object 305, as discussed above. The process 500 continues in a block 590.

In the block 590, the vehicle computer 110 determines whether to continue the process 500. For example, the vehicle computer 110 can determine not to continue upon receiving a request to transition the vehicle 105 to the OFF state. Conversely, the vehicle computer 110 can determine to continue based on not receiving the request to transition the vehicle 105 to the OFF state. If the vehicle computer 110 does not receive the request to transition the vehicle 105 to the OFF state, then the vehicle computer 110 deactivates the second sensor 115*b* of the external sensor assembly 200*a*, and the process 500 returns to the block 550. If the vehicle receives the request to transition the vehicle 105 to the OFF state, the vehicle computer 110 transitions the vehicle 105 to the OFF state, and the process 500 ends following the block 590.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor programmed to:
   upon detecting an absence of a user inside a passenger cabin of a vehicle, transition the vehicle from an ON state to a minimal power state, wherein in the ON state each of a first sensor positioned to face the passenger cabin, a second sensor positioned to face the passenger cabin, and an external sensor are activated, and in the minimal power state the first sensor remains activated at a reduced power consumption mode and each of the second sensor and the external sensor are deactivated;
   while in the minimal power state, detect an object inside the passenger cabin based on data from the first sensor;
   upon detecting the object, activate the second sensor;
   based on data from the second sensor, classify the object as one of preferred or nonpreferred;
   upon classifying the object as preferred, activate the external sensor to monitor an environment outside the passenger cabin based on determining the object is within a specified zone of the passenger cabin;
   determine a priority level for the preferred object based on data from the external sensor, wherein the priority level is one of high or low, high priority being based on a presence of an unauthorized object; and
   actuate a vehicle component to reduce the priority level based on determining the priority level for the preferred object is high.

2. The system of claim 1, wherein the instructions further include instructions to, upon classifying the object as preferred, provide the classification to a remote computer.

3. The system of claim 1, wherein the instructions further include instructions to, upon determining the priority level for the preferred object is high, provide the priority level to a remote computer.

4. The system of claim 1, wherein the instructions further include instructions to determine the priority level is high for the preferred object based on identifying an unauthorized user within a threshold area around the vehicle via the data from the external sensor.

5. The system of claim 4, wherein the instructions further include instructions to, upon detecting a non-movable object outside the passenger cabin and within the threshold area, update the threshold area based on the non-moveable object.

6. The system of claim 4, wherein the instructions further include instructions to actuate the vehicle component based additionally on the unauthorized user.

7. The system of claim 1, wherein the second sensor has a higher power draw than the first sensor.

8. The system of claim 1, wherein the instructions further include instructions to determine the priority level for the preferred object is high based on detecting a temperature of the preferred object being outside of a temperature range.

9. The system of claim 8, wherein the instructions further include instructions to determine the temperature range based on the preferred object.

10. The system of claim 9, wherein the instructions further include instructions to actuate the vehicle component based additionally on the temperature of the preferred object.

11. The system of claim 1, wherein the instructions further include instructions to, upon detecting the object inside the passenger cabin, provide a request to a remote computer.

12. The system of claim 11, wherein the instructions further include instructions to classify the object based on a response received from the remote computer in response to the request.

13. The system of claim 1, wherein the instructions further include instructions to, upon classifying the object as preferred, provide a message to a remote computer identifying an updated storage position for the preferred object inside the passenger cabin.

14. The system of claim 1, wherein the vehicle component is one of a lighting component, a propulsion component, a climate control component, a lock component, or a window component.

15. The system of claim 1, wherein, in the ON state, a power supply of the vehicle provides power to each of a plurality of vehicle components, including the vehicle component, and to each of a plurality of vehicle sensors, including the first sensor, the second sensor, and the external sensor.

16. A method, comprising:
  upon detecting an absence of a user inside a passenger cabin of a vehicle, transitioning the vehicle from an ON state to a minimal power state, wherein in the ON state each of a first sensor positioned to face the passenger cabin, a second sensor positioned to face the passenger cabin, and an external sensor are activated, and in the minimal power state the first sensor remains activated at a reduced power consumption mode and each of the second sensor and the external sensor are deactivated;
  while in the minimal power state, detecting an object inside the passenger cabin based on data from the first sensor;
  upon detecting the object, activating the second sensor;
  based on data from the second sensor, classifying the object as one of preferred or nonpreferred;
  upon classifying the object as preferred, activating the external sensor to monitor an environment outside the passenger cabin based on determining the object is within a specified zone of the passenger cabin;
  determining a priority level for the preferred object based on data from the external sensor, wherein the priority level is one of high or low, high priority being based on a presence of an unauthorized object; and
  actuating a vehicle component to reduce the priority level based on determining the priority level for the preferred object is high.

17. The method of claim 16, further comprising determining the priority level is high for the preferred object based on detecting a moveable object within a threshold area around the vehicle via the data from the sensor.

18. The method of claim 16, further comprising determining the priority level for the preferred object is high based on detecting a temperature of the preferred object being outside of a temperature range.

19. The method of claim 16, wherein the vehicle component is one of a lighting component, a propulsion component, a climate control component, a lock component, or a window component.

20. The system of claim 19, wherein, in the OFF state, a power supply of the vehicle provides power to at least some of the plurality of vehicle sensors and to none of the vehicle components.

* * * * *